United States Patent [19]
Kunze et al.

[11] Patent Number: 5,561,272
[45] Date of Patent: Oct. 1, 1996

[54] SLEEVE HEAD HAVING A PLURALITY OF CABLE INTRODUCTION OPENINGS

[75] Inventors: Dieter Kunze, Neuried; Dieter Kreutz, Gruenwald, both of Germany

[73] Assignee: Siemens Aktiengesellschaft, Munich, Germany

[21] Appl. No.: 285,519

[22] Filed: Aug. 4, 1994

[30] Foreign Application Priority Data

Aug. 11, 1993 [DE] Germany ............... 43 26 971.0

[51] Int. Cl.⁶ ............... H02G 15/013; H02G 3/18
[52] U.S. Cl. ............... 174/151; 174/152 G
[58] Field of Search ............... 174/151, 152 G, 174/65 R, 153 G, 50.59, 65 G, 65 SS; 277/188 R

[56] References Cited

U.S. PATENT DOCUMENTS

| | | | |
|---|---|---|---|
| 2,717,792 | 9/1955 | Pelley | 174/152 G X |
| 2,771,502 | 11/1956 | King et al. | 174/92 |
| 3,054,847 | 9/1962 | Colbert | 174/88 R |
| 3,104,277 | 9/1963 | Bossu | 174/151 |
| 3,135,535 | 6/1964 | Shepard | 174/152 G X |
| 4,103,911 | 8/1978 | Giebel et al. | 277/210 |
| 4,404,463 | 9/1983 | Eder et al. | 174/65 SS X |
| 5,235,138 | 8/1993 | Shah et al. | 174/151 |
| 5,360,945 | 11/1994 | Truesdale, Jr. et al. | 174/151 |

FOREIGN PATENT DOCUMENTS

| | | |
|---|---|---|
| 0309895 | 4/1989 | European Pat. Off. . |
| 0402653 | 12/1990 | European Pat. Off. . |
| 2274125 | 1/1976 | France . |
| 2649838 | 1/1991 | France . |
| 2427677 | 12/1975 | Germany . |
| 724596 | 2/1955 | United Kingdom . |

*Primary Examiner*—Kristine L. Kincaid
*Assistant Examiner*—Paramita Ghosh
*Attorney, Agent, or Firm*—Hill, Steadman & Simpson

[57] ABSTRACT

A sleeve head for a cable sleeve has a plurality of conically-shaped cable introduction openings which are divided in a longitudinal direction and receive conical seal elements. The sleeve head is composed of a central part and a corresponding annular part, wherein each of the cable introduction openings are arranged in a parting surface between the two parts. The parting line between the central part and the annular part can, for example, be carried out in a polygon shape with the cable introduction openings being arranged in the corners of this shape. Expediently, a single coherent-shaped seal part is employed which has both annular seal elements for each of the cable introduction openings and a sealing insert that extends between the cable introduction openings.

20 Claims, 7 Drawing Sheets

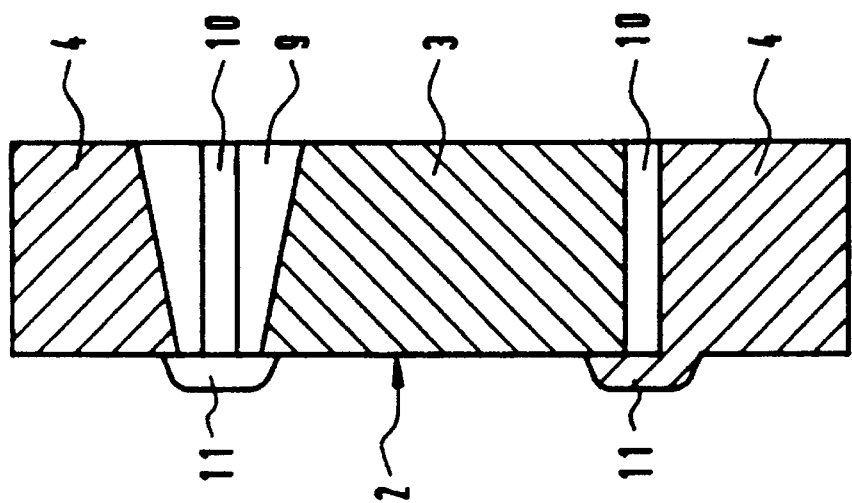
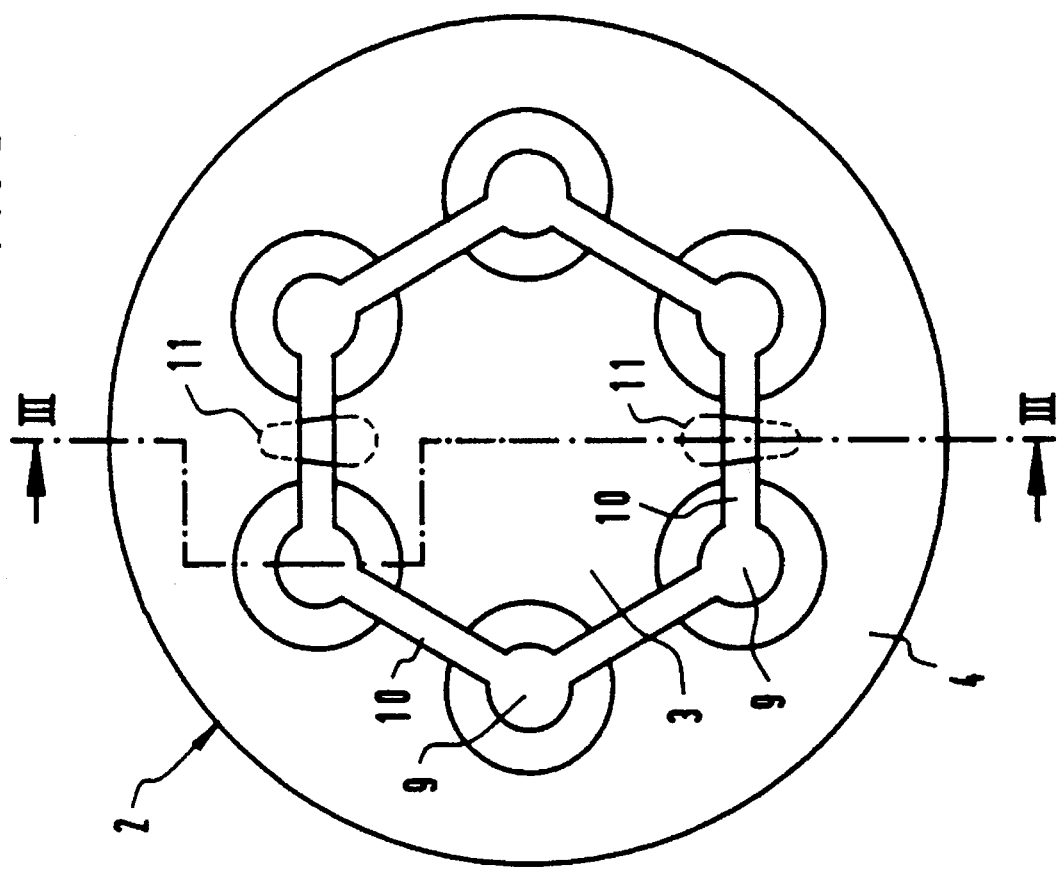

FIG 4
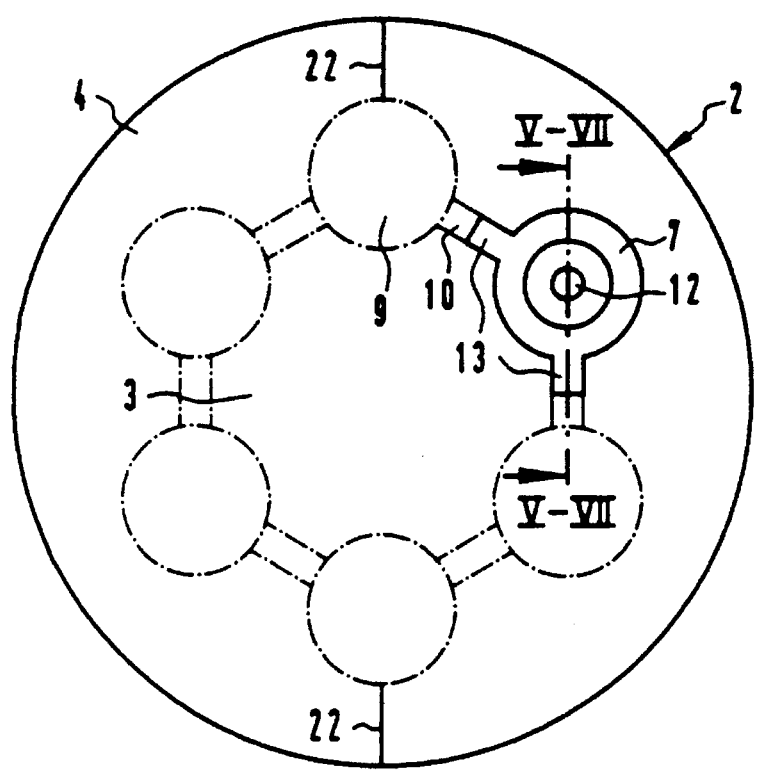
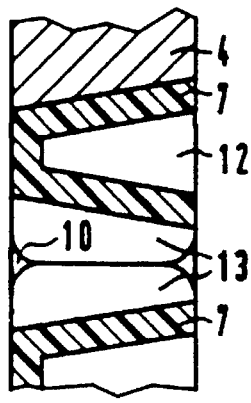
FIG 5
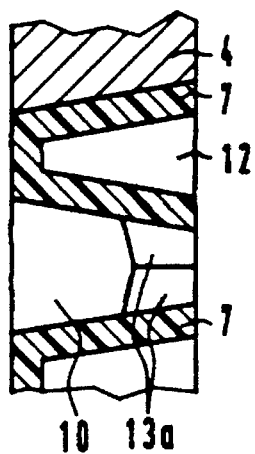
FIG 6
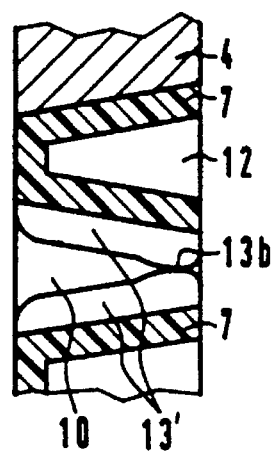
FIG 7

SLEEVE HEAD HAVING A PLURALITY OF CABLE INTRODUCTION OPENINGS

BACKGROUND OF THE INVENTION

The present invention is directed to a sleeve head having a plurality of cable introduction openings which are divided in the longitudinal direction with each of the openings receiving an annular seal of plastic material and being acted on by pressure means.

German OS 24 27 677 and its corresponding U.S. Pat. No. 4,103,911, whose disclosure is incorporated herein by reference thereto, disclose a sleeve head having a plurality of cable introduction openings which are divided in the longitudinal direction so that the cable introduction openings must each be cut out as needed. A tape-shaped plastic seal material must be respectively inserted in each opening as a sealant. The division of the sleeve head occurs with parallel parting planes so that a plurality of seal member segments are formed wherein a relatively limited number of cables can be introduced.

European Patent Application 0 402 653 A2 discloses a cable introduction seal of deformable material in the form of an annular plug composed of an expandable elastomer that is introduced into a cable introduction opening which is in the form of a cylindrical sleeve of a housing. The deformation of the seal occurs in the fashion of a simple and known stuffing box principle.

SUMMARY OF THE INVENTION

The object of the present invention is to create a sleeve head wherein a plurality of cable introduction openings having longitudinal divisions are possible so that a corresponding plurality of uncut cables can be introduced whereby the seals are to be accomplished in a simple way with pre-formed seal units. To accomplish these goals, the sleeve head of the present invention is composed of a central part and of a corresponding annular part and the cable introduction openings are arranged along a parting surface between the central part and the annular part with respectively one-half of each of the cable introduction openings being cut in the central part and one-half of each of the cable introduction openings being cut in the annular part. The walls of the cable introduction openings are conically convergent and the head further includes conical annular seal members which are introduced into the cable introduction openings in the assembled condition and with sealing inserts also being arranged in the parting region between the cable introduction openings.

The advantage over the prior art, which occurs with the sleeve head of the present invention, is that all cable introduction openings lie in a parting surface of the sleeve head. As a result thereof, for example, a continuous parting surface is selected; however, any meaningful geometrical shape can also be utilized, such as, for example, the shape of a polygon in whose corners the cable introduction openings are arranged or the shape of an oval or a circle.

It is also advantageous that the seals are formed with the assistance of elastic seal inserts in the form of conical annular seal members, wherein the seal inserts between individual cable introductions can occur with the same material. These seals can also be formed by lateral projections on the annular seal members so that only a single type of seal member or element is required.

Corresponding to the conical shape of the annular seals, the cable introduction openings are also conically constructed. After the cable is mounted in the annular seal member, the annular seal members are axially pressed with the pressure means that are adequate to form an adequate seal between the conical cable introduction opening and the cable introduced in the inside of the annular seal member. The seal member, in turn, can be released and re-employed. When the annular seal members or elements are divided in longitudinal direction or at least comprise an annular slot, they can also be employed on uncut cables.

The assembly of the sleeve head is simple, since the central part is inserted between the cable to be introduced, and the annular part of the sleeve head is then slipped on. The annular seal members are plugged on for sealing the cable. The pressing of the annular seal members into the cable introduction openings then, subsequently, occur with the assistance of pressure means. Given employment of such a sleeve head in a pot sleeve, uncut or, respectively, spliced cables can be mounted without further ado. The annular part of the sleeve head can be slipped onto the pre-mounted central part proceeding from the pot sleeve side or, respectively, the spliced side. When these sleeve heads of the invention are also to be employed given an elongated, double-sided cable sleeve with uncut cables, a divided annular part must be employed for the sleeve head, and these then are put in place on one another proceeding from the outside and being clamped to one another with an appropriate clamping means. The principle of the sleeve head of the invention, however, are fully maintained. Here, too, the inventive measures and shapes such as the conical construction of the cable introduction openings and of the annular seal elements or members as well as the axial pressing with a pressure means prevails in the same way.

Other advantages and features of the invention will be readily apparent from the following description of the preferred embodiments, the drawings and claims.

BRIEF DESCRIPTION OF THE DRAWINGS

FIG. 2 is a front view of the sleeve head of the present invention taken from the right side of FIG. 1;

FIG. 3 is a cross sectional view taken along the lines III—III of FIG. 2;

FIG. 4 shows the introduction and employment of an annular seal element in a front view of the sleeve head of FIG. 2;

FIG. 5 is a partial cross sectional view taken along the lines V-VII—V-VII of FIG. 4;

FIG. 6 is a partial cross sectional view of a second embodiment taken along the lines V-VII—V-VII of FIG. 4;

FIG. 7 is a third embodiment of a seal element taken along the lines V-VII—V-VII of FIG. 4;

DESCRIPTION OF THE PREFERRED EMBODIMENTS

Figure 1:
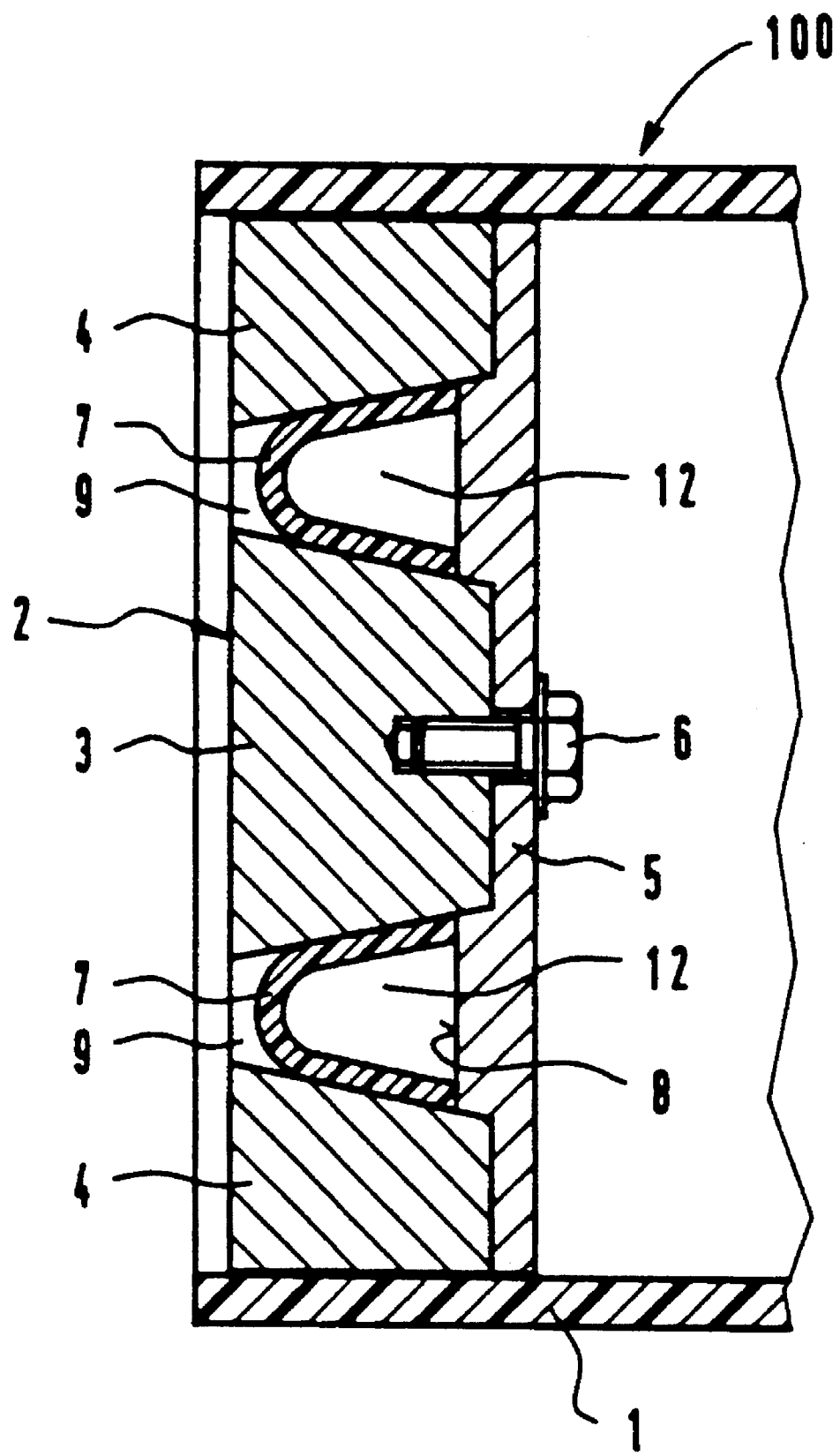
FIG. 1 is a partial cross sectional view of an end of a cable sleeve utilizing the sleeve head of the present invention.

The principles of the present invention are particularly useful when incorporated in a cable sleeve, generally indicated at 100 in FIG. 1. The cable sleeve 100 has a sleeve element 1 which can be a pot sleeve having a closed end or can be a through sleeve and, as illustrated, acts in conjunction with a sleeve head, generally indicated at 2, for closing one end of the cable sleeve 100.

The sleeve head 2 is a divided sleeve head which is composed of a central part 3 and of an annular part 4 which surrounds the central part 3, wherein the cable introduction openings 9 are arranged in a parting surface between the central part 3 and the annular part 4. The annular seal members or elements 7 have a conical shape and are introduced into the cable introduction openings that are also fashioned conically with the conical converging toward the outside of the cable sleeve 100. These annular seal elements 7 are closed here at their narrow end and serve as sealing terminations, for example when not needed. When cables are to be introduced in the inside 12 of an annular seal element 7, the annular seal elements are cut off at the corresponding location, depending on the diameter of the cable, so that a rough matching of the opening to the diameter of the cable will occur. A pressure means 5, which is illustrated as a plate having projections 8, is secured on one side of the sleeve head 2 by a pressure screw 6. As illustrated, this one side is the inside of the cable head and the pressure means, for example, is a disc having the projections 8 in the regions of each of the cable introduction openings 9. These projections will enter into the cable introduction openings 9 and press the annular seal element 7 against the introduced cable. The seal between the wall of the cable introduction opening 9 and the introduction cable occurs in a simple manner. It should be noted that those elements 8 for pressing on a seal element 7 having a cable have an aperture for the cable to pass therethrough.

The construction of the sleeve head 2 is made clear in FIG. 2. It is composed of the central part 3 and the surrounding annular part 4. The parting line lying between the two forms a polygon, wherein the conical introduction openings 9 are arranged in each of the corners of the polygon. The parting region 10 of the parting lines proceed in straight sub-sections between the individual introduction openings 9. As illustrated in FIGS. 2 and 3, detents 11 are provided on one of the parts, such as the annular part 4, to form stops to aid in assembling the annular part and the central part in an axial direction. It should be pointed out that, as illustrated in FIG. 3, these detents 11 are part of the annular part 4; however, they could be provided on the central part 3 if desired.

As best illustrated in FIGS. 4 and 5, the conically-fashioned annular seal members 7 are introduced into the openings 9. Each of the annular seal members 7 comprises two lateral projections 13 which are applied so that they project into the parting region 10 between the cable introduction openings 9, and these respective projections of the two neighboring annular seals supplement one another and, thus, yield the necessary seal after pressing between the annular part 4 and the central part 3. In FIG. 5, these projections 13 of the annular seal members 7 are fashioned so that they have a uniform contact that occurs in the parting region 10 over the entire width of the parting region. However, in a modification illustrated in FIG. 6, a small partial projection 13a is provided and only extends over a short sub-length of this thickness of the parting region 10. Another modification is shown in FIG. 7, wherein each of the projections 13' extend only partially into the region and are provided with a shaped portion 13b in a sub-region that are located at the wide region of the cable introduction opening 9. Upon introduction of this seal member, for example, a pre-guidance is thereby achieved wherein the force for pressing is only directed in the portion 13b during the last part of the pressing path.

In the previous discussions, the annular part 4 was considered to be a single part which slipped over the central part 3. However, the annular part can be sub-divided along a parting line 22 into two parts so that it can be assembled around the annular part 3 and around an uncut cable. When working with uncut cables, each of the seal elements or members 7 should have a cut or splice, such as the splice 15 in the seal element 7a of FIG. 8, to allow slipping the seal element around the uncut cable.

Figure 8:
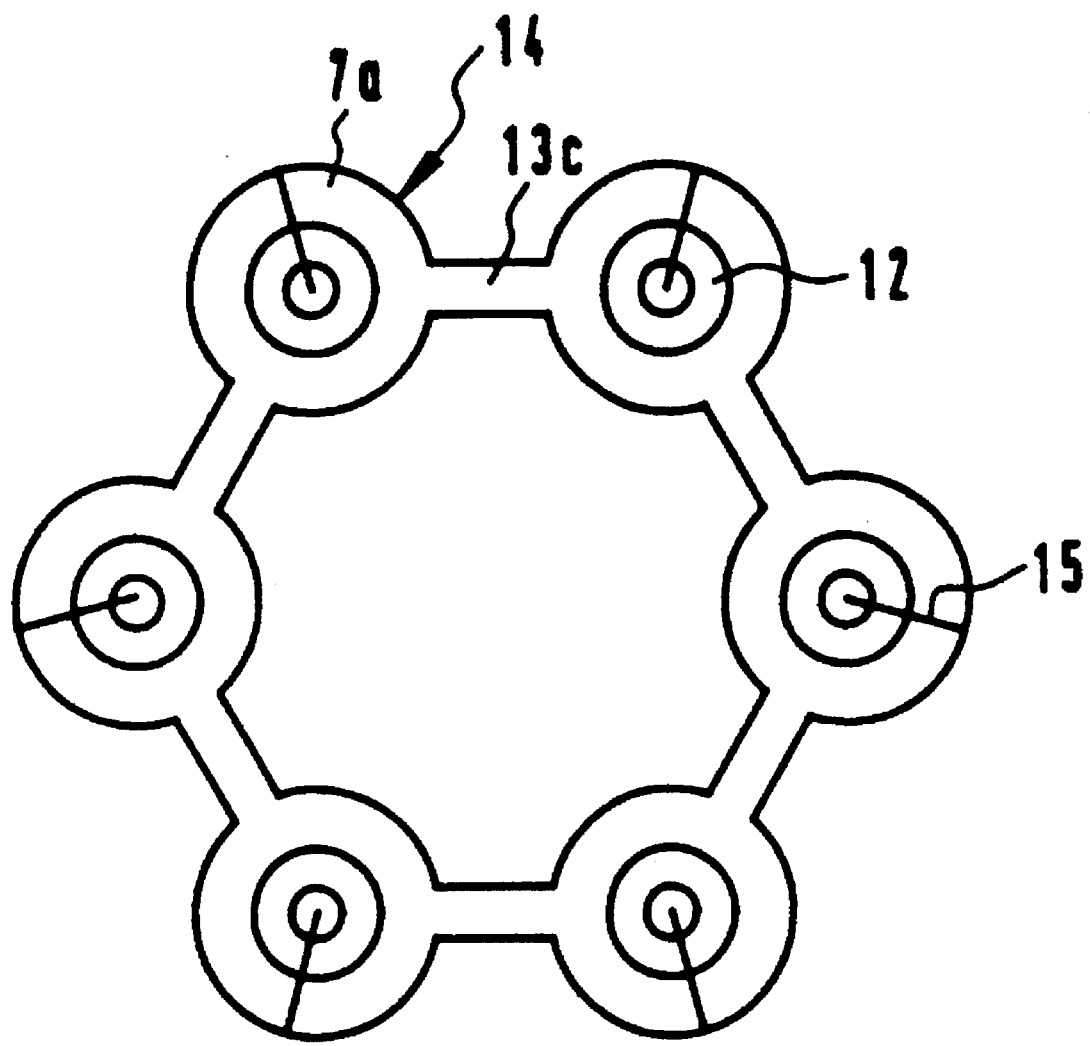
FIG. 8 is a front view of an embodiment of the plurality of joined-together annular seal elements in accordance with the present invention.

In FIG. 8, a single seal part 14, which is composed of annular seal members 7a and the intervening seal inserts 13c of the entire parting surface are formed as a single unit which has the shape of a polygon, such as a six-sided polygon with each of the openings at one of the six corners. Each of the elements 7a is provided with a slit 15 to allow insertion of an uncut cable into the interior of the element. If these cuts 15 are not provided, then they are made when a cable is to be inserted.

Figure 9:
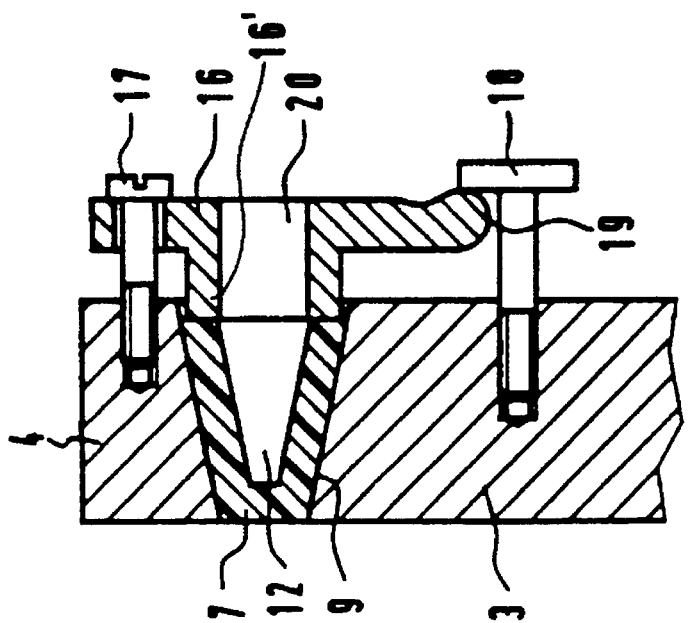
FIG. 9 is a cross sectional view illustrating a pressure means for acting on the cable introduction seal element.
Figure 10:
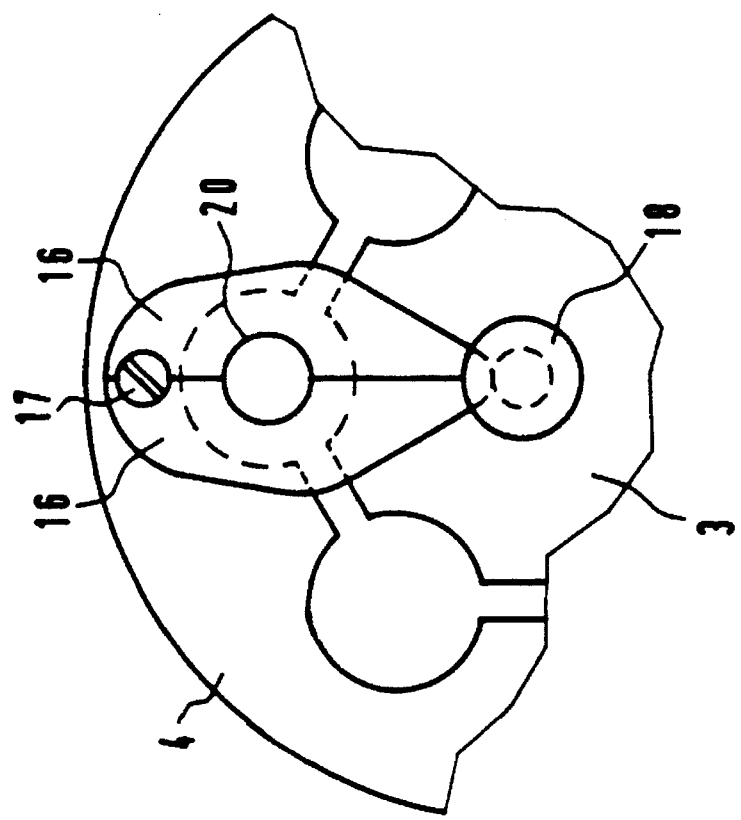
FIG. 10 is a front view of the arrangement of FIG. 9.

In order to apply pressure to the seal member 7, pressure means, such as illustrated in FIGS. 9 and 10, are provided. In this arrangement, the pressure means is composed of two leg parts 16 which are joined together at one end by an integral hinge 19. In the joined condition, these leg parts have a cable bushing opening 20 that lies in the position of the cable introduction opening 9 and provides a passage for the cable. The pressure means has a portion 16' that projects into the cable introduction opening 9 on the side facing toward the annular seal member 7 and acts on the introduced annular seal member 7 given axially applied pressures by the screws 17 and 18. The annular seal 7 will be deformed and ultimately forms a seal relative to the introduced cable. As mentioned, the two parts 16 are held together by a hinge 19.

As illustrated, the two leg parts 16 form the cable bushing opening in their assembled condition and the leg parts 16 are held with the screws 17 and 18. The axial pressure is generated by screwing the two screws 17 and 18 into the members 4 and 3, respectively. Each cable introduction opening of the sleeve head can be equipped with the pressure means of this type.

Figure 11:
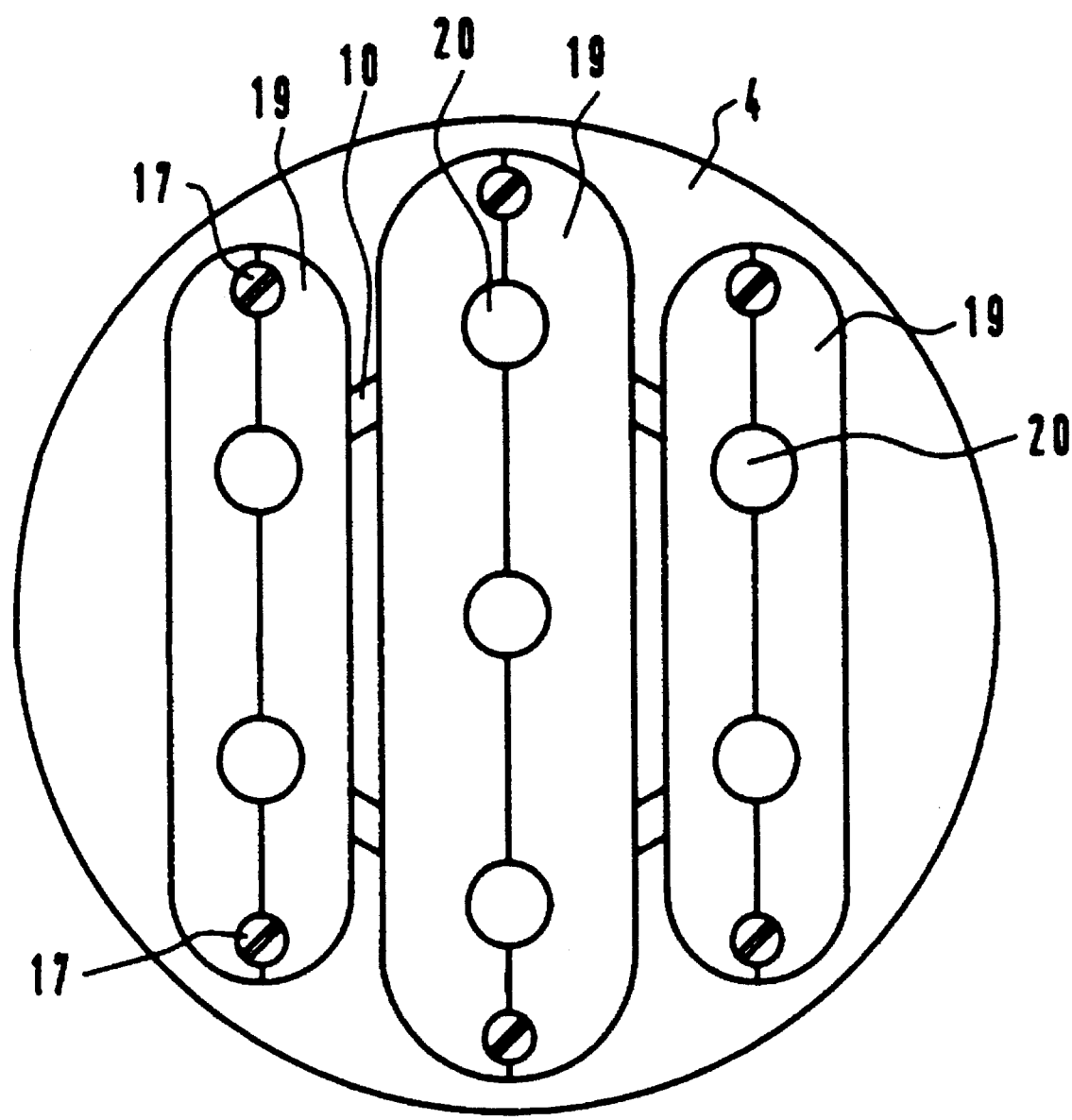
FIG. 11 is a front view showing a modification of pressure means for cable introduction.

In the embodiment or modification of the pressing means, as illustrated by the pressing means 19 in FIG. 11, the pressure means 19 will act on two or more cable openings and is provided with two or more openings 20.

Figure 13:
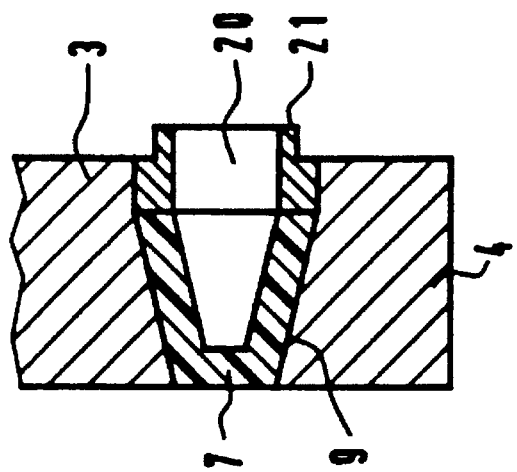
FIG. 13 is a cross sectional view of the pressure means of FIG. 12.
Figure 12:
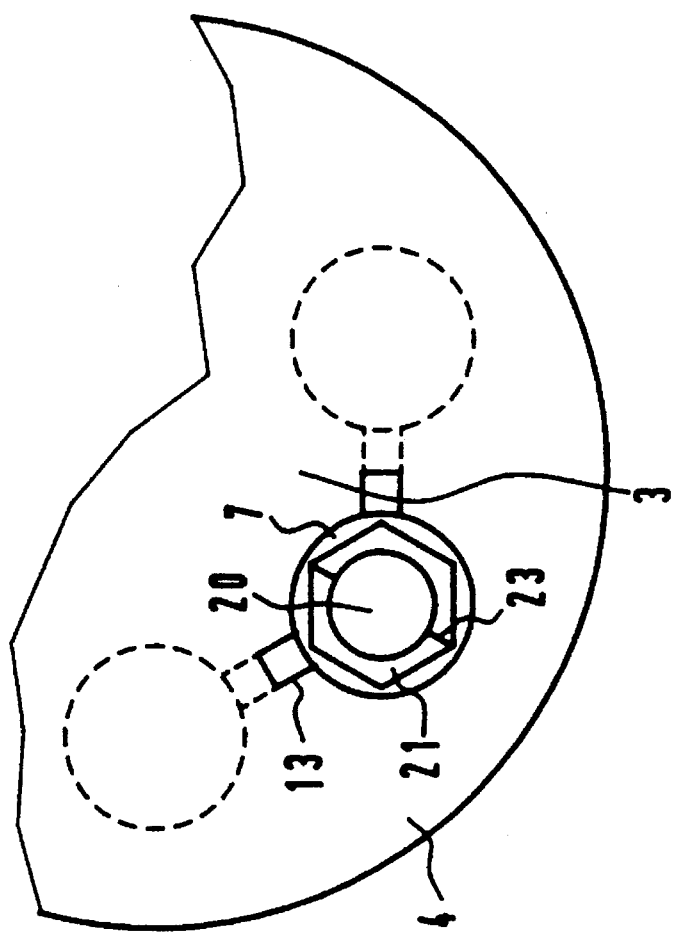
FIG. 12 is a front view of another embodiment of a pressure means for the present invention.

Instead of providing pressure means, such as shown in FIGS. 9, 10 and 11, the pressure means can comprise a ring nut 21, which is illustrated in FIGS. 12 and 13. The ring nut 21 is employed so that it screws into the threads in the wide end of the cable introduction opening 9 and, thus, exerts the axial pressure onto the inserted annular seal member 7 and the projections 13. The introduced cable is conducted through the bushing 20. The ring nut 21 can be formed with a slot or slit, such as 23, so that it can be slipped onto an uncut cable and it will have appropriate pin and holes to hold the two parts together in the desired position.

As illustrated in the cross sectional view of FIG. 13, the nut 21, when threaded into the opening, will act on one end of the element 9 to urge the tapered element 7 into the tapered opening 9. In FIG. 13, it is shown in its maximum inserted position into the opening 9 achieved with maximum pressing of the insert 7.

Although various minor modifications may be suggested by those versed in the art, it should be understood that we wish to embody within the scope of the patent granted hereon all such modifications as reasonably and properly come within the scope of our contribution to the art.

We claim:

1. A sleeve head comprising a plurality of cable introduction openings divided in a longitudinal direction and having annular seal elements of an elastic material in each of the introduction openings and pressure means for acting on the seal elements, the sleeve head being formed of a central part and a corresponding annular part surrounding the central part, the cable introduction openings being arranged on a parting line between the central part and annular part with one-half of each of the cable introduction openings being cut out of the central part and the other one-half of each opening cut out of the annular part with the walls of each of the cable introduction openings conically converging along one side of the head, said annular seal elements having a conical shape being introduced into the cable introduction openings and seal inserts being arranged in a parting region of the parting line between the cable introduction openings.

2. A sleeve head according to claim 1, wherein the parting line forms a polygon and wherein the cable introduction openings are respectively arranged in the corners of the polygon.

3. A sleeve head according to claim 1, wherein the parting line forms an oval.

4. A sleeve head according to claim 1, wherein the parting line forms a circle.

5. A sleeve head according to claim 1, wherein each of the annular seal elements and the seal inserts form a single, coherent formed part with the seal inserts extending between each of the annular seal elements.

6. A sleeve head according to claim 1, wherein the annular seal elements have lateral projections proceeding from each of the cable introduction openings and extending into the parting region between the cable introduction openings, said projections forming a connection between individual annular seal elements to form the seal inserts for the parting regions.

7. A sleeve head according to claim 6, wherein the projections extend over an entire width of the parting region.

8. A sleeve head according to claim 6, wherein the projections extend over a sub-length of a width of the parting region.

9. A sleeve head according to claim 6, wherein the projections have a shaped portion in a sub-region located at a wide region of each of the cable introduction openings, said shaped portions coacting to complete the seal between adjacent openings.

10. A sleeve head according to claim 1, wherein the pressure means includes a pressure plate for covering the central part and portions of the annular part, said pressure plate having projections at the locations of the cable introduction openings for applying pressure on each of the seal elements received in the cable introduction openings.

11. A sleeve head according to claim 10, wherein the pressure plate is divided corresponding to a shape the central part and the annular part.

12. A sleeve head according to claim 1, wherein the pressure means which includes separate pressure devices being arranged for each of the cable introduction openings.

13. A sleeve head according to claim 12, wherein each of the pressure devices is divided transversely over each of the cable introduction openings.

14. A sleeve head according to claim 13, wherein each pressure device has individual parts that are connected to one another via an articulation formed by a film hinge.

15. A sleeve head according to claim 1, wherein detents are provided on one of the central part or the annular part to form a stop element for axially arranging the parts in the desired axial position.

16. A sleeve head according to claim 1, wherein the annular seal elements are composed of rubber.

17. A sleeve head according to claim 16, wherein said rubber is silicone rubber.

18. A sleeve head according to claim 1, wherein the annular seal elements are closed cap-like at one end.

19. A sleeve head according to claim 1, wherein the annular part is divided by a parting line into at least two halves and said head includes means for clamping the two halves together around the central part.

20. A sleeve head according to claim 1, wherein the annular seal elements include elastic and plastic sealants.

* * * * *